US008928235B2

(12) United States Patent
Angeles

(10) Patent No.: US 8,928,235 B2
(45) Date of Patent: Jan. 6, 2015

(54) DAMPER CIRCUIT FOR SWITCHED DIMMING

(75) Inventor: Christian Pura Angeles, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 13/193,804

(22) Filed: Jul. 29, 2011

(65) Prior Publication Data

US 2013/0057167 A1    Mar. 7, 2013

(51) Int. Cl.
*H05B 37/00* (2006.01)
*H05B 33/08* (2006.01)

(52) U.S. Cl.
CPC ........ *H05B 33/0815* (2013.01); *H05B 33/0842* (2013.01)
USPC ..................................................... 315/200 R

(58) Field of Classification Search
CPC ............................... H05B 33/08; H05B 37/02
USPC ....... 315/200 R, 201, 177, 224, 209 SC, 276, 315/291
See application file for complete search history.

(56) References Cited

U.S. PATENT DOCUMENTS

| 6,222,749 | B1* | 4/2001 | Peron .......................... 363/125 |
| 7,974,057 | B2 | 7/2011 | Schiene et al. |
| 7,978,485 | B2* | 7/2011 | Stamm et al. ................... 363/44 |
| 2010/0165519 | A1 | 7/2010 | Henson et al. |
| 2010/0213859 | A1* | 8/2010 | Shteynberg et al. .......... 315/224 |
| 2010/0259185 | A1* | 10/2010 | Sadwick et al. .............. 315/291 |
| 2010/0259196 | A1* | 10/2010 | Sadwick et al. .............. 315/309 |
| 2010/0327773 | A1* | 12/2010 | Gu et al. ....................... 315/307 |
| 2011/0148318 | A1* | 6/2011 | Shackle et al. ................ 315/291 |

OTHER PUBLICATIONS

NXP Semiconductors, "UM10481: SSL21082 Reference Board User Manual," Rev. 2.1, NXP B. V., Nov. 28, 2011, 18 pages.

* cited by examiner

*Primary Examiner* — Minh D A
(74) *Attorney, Agent, or Firm* — Blakely Sokoloff Taylor & Zafman LLP

(57) ABSTRACT

A power converter includes dimmer circuit, a rectifier circuit, and a thyristor damper circuit. The dimmer circuit provides a dimmer voltage in response to an input voltage. The rectifier circuit provides a rectified voltage in response to the dimmer voltage. The thyristor damper circuit dampens an input current associated with the rectified voltage based on the input current and ceases dampening the rectified voltage based on the rectified voltage.

20 Claims, 5 Drawing Sheets

DAMPER CIRCUIT FOR SWITCHED DIMMING

FIELD

This disclosure relates generally to power converters, and more specifically to power converters utilized with a thyristor dimmer.

BACKGROUND

Electronic devices use power to operate. Switched mode power converters are commonly used due to their high efficiency, small size and low weight to power many modern electronics. Conventional wall sockets provide a high voltage alternating current. In a switching power converter a high voltage alternating current (ac) input is converted to provide a regulated direct current (dc) output through an energy transfer element. The switched mode power converter control circuit provides output regulation by sensing the output and controlling it using a closed loop. During operation, a switch is utilized to provide the desired output by varying the duty cycle (typically the ratio of the on time of the switch to the total switching period) of the switch in a switched mode power converter (also referred as a switching power supply or a switched mode power supply).

In one type of dimming for lighting applications, a TRIAC dimmer circuit removes a portion of the ac input voltage to limit the amount of voltage and current supplied to an incandescent lamp. This is known as phase dimming because it is often convenient to designate the position of the missing voltage in terms of a fraction of the period of the ac input voltage measured in degrees. In general, the ac input voltage is a sinusoidal waveform and the period of the ac input voltage is referred to as a full line cycle. As such, half the period of the ac input voltage is referred to as a half line cycle. An entire period has 360 degrees, and a half line cycle has 180 degrees. Typically, the phase angle is a measure of how many degrees (from a reference of zero degrees) of each half line cycle the dimmer circuit removes. As such, removal of half the ac input voltage in a half line cycle by the TRIAC dimmer circuit corresponds to a phase angle of 90 degrees. In another example, removal of a quarter of the ac input voltage in a half line cycle may correspond to a phase angle of 45 degrees.

Although phase angle dimming works well with incandescent lamps that receive the altered ac line voltage directly, it typically creates problems for light emitting diode (LED) lamps driven by a switching power converter. Conventional regulated switching power converters are typically designed to ignore distortions of the ac input voltage and deliver a constant regulated output until a low input voltage causes them to shut off. As such, conventional regulated switching power converters cannot dim LED lamps. Unless a power converter for an LED lamp is specially designed to recognize and respond to the voltage from a TRIAC dimmer circuit in a desirable way, a TRIAC dimmer can produce unacceptable results such as flickering of the LED lamp.

Another difficulty in using TRIAC dimming circuits with LED lamps comes from a characteristic of the TRIAC itself. A TRIAC is a semiconductor component that behaves as a controlled ac switch. In other words, it behaves as an open switch to an ac voltage until it receives a trigger signal at a control terminal, which causes the switch to close. The switch remains closed as long as the current through the switch is above a value referred to as the holding current. Most incandescent lamps use more than enough current from the ac power source to allow reliable and consistent operation of a TRIAC. However, the low current used by efficient power converters to drive LED lamps may not provide enough current to keep a TRIAC conducting for the expected portion of the ac line period. Therefore, conventional power converter controller designs rely on a dummy load, sometimes called a bleeder circuit, to take enough extra current from the input of the power converter to keep the TRIAC conducting.

In addition, the sharply increasing input voltage when the TRIAC fires during each half line cycle causes inrush input current ringing which may reverse several times during the half line cycle. During these current reversals, the TRIAC may prematurely turn off and cause flickering in the LED lamp. A series resistor damper may then be utilized to slow down the charging of the input capacitor, and dampen the input current ringing and prevent voltage overshoot of the input capacitor. In general, the damper circuit is external from the integrated circuit of the power converter controller and is implemented with a resistor coupled at the input of the power converter. However, use of the damper resistor alone degrades the overall efficiency of the system.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
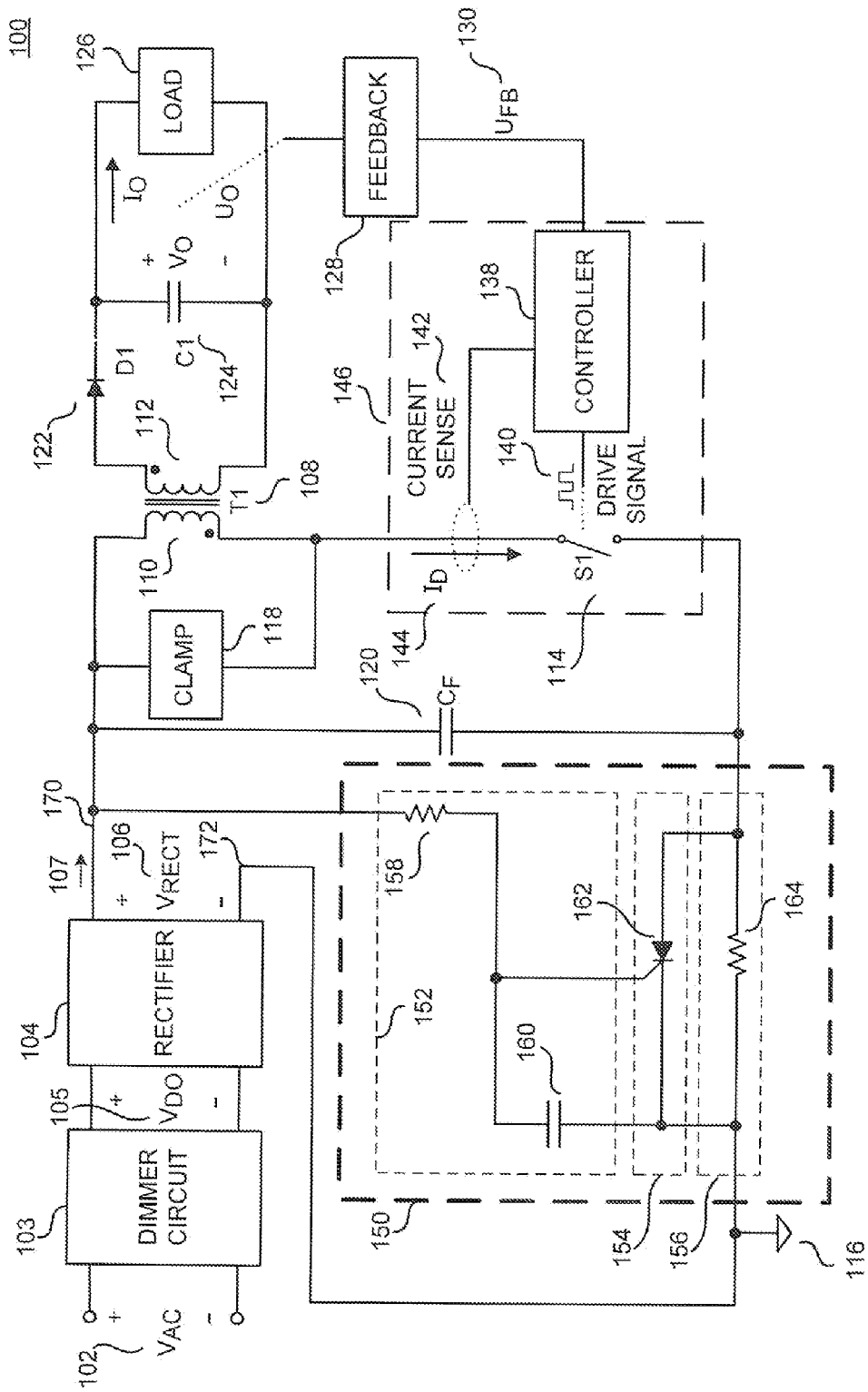
FIG. 1 is a functional block diagram illustrating an example power converter with a thyristor damper circuit in accordance with teachings of the present disclosure.

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As used herein, the term "circuit" can include an electronic circuit, one or more processors (e.g., shared, dedicated, or group of processors such as but not limited to microprocessors, digital signal processors, or central processing units) and memory that execute one or more software or firmware programs, combinational logic circuits, an application specific integrated circuit, and/or other suitable components that provide the described functionality. Additionally, as will be appreciated by those of ordinary skill in the art, one or more circuits can be combined in an integrated circuit if desired. Furthermore, the term "signal" may refer to one or more currents, one or more voltages, or a data signal.

In one type of dimming for lighting applications, a TRIAC dimmer circuit typically removes a portion of the ac input voltage to limit the amount of voltage and current supplied to an incandescent lamp. This is known as phase dimming because it is often convenient to designate the position of the missing voltage in terms of a fraction of the period of the ac input voltage measured in degrees. In general, the ac input voltage is a sinusoidal waveform and the period of the ac input voltage is referred to as a full line cycle. As such, half the period of the ac input voltage is referred to as a half line cycle. An entire period has 360 degrees, and a half line cycle has 180 degrees. Typically, the phase angle is a measure of how many degrees (from a reference of zero degrees) of each half line cycle the dimmer circuit removes.

Although phase angle dimming works well with incandescent lamps that receive the altered ac line voltage directly, it typically creates problems for light emitting diode (LED) lamps driven by a switching power converter. Conventional regulated switching power converters are typically designed to ignore distortions of the ac input voltage and deliver a constant regulated output until a low input voltage causes them to shut off. As such, conventional regulated switching power converters cannot dim LED lamps. Unless a power converter for an LED lamp is specially designed to recognize and respond to the voltage from a TRIAC dimmer circuit in a desirable way, a TRIAC dimmer can produce unacceptable results such as flickering of the LED lamp. Thus, a power converter may include an improved conventional power converter controller that is designed to respond to a TRIAC dimmer circuit by directly sensing the ac input voltage to determine when the ac input voltage is cut-off due to the dimming circuit. Typically, the ac input voltage is directly sensed with circuitry external to the integrated circuit of the conventional controller. The sensed ac input voltage may be received by the integrated circuit of the improved conventional controller at a terminal dedicated to receiving the sensed ac input voltage or at another terminal which performs multiple functions.

Another difficulty in using TRIAC dimming circuits with LED lamps comes from a characteristic of the TRIAC itself. A TRIAC is a semiconductor component that behaves as a controlled ac switch. In other words, it behaves as an open switch to an ac voltage until it receives a trigger signal at a control terminal which causes the switch to close. The switch remains closed as long as the current through the switch is above a value referred to as the holding current. Most incandescent lamps take more than enough current from the ac power source to allow reliable and consistent operation of a TRIAC. However, the low current taken by efficient power converters which drive LED lamps from the ac power source may not be enough to keep a TRIAC conducting for the expected portion of the ac line period. Therefore, power converter controller designs usually rely on the power converter including a dummy load, sometimes called a bleeder circuit, to take enough extra current from the input of the power converter to keep the TRIAC conducting.

The sharply increasing input voltage when the TRIAC fires during each half line cycle causes inrush input current ringing which may reverse several times during the half line cycle. During these current reversals, the TRIAC may prematurely turn off and cause flickering in the LED lamp. A series resistor damper may then be utilized to slow down the charging of the input capacitor, and dampen the input current ringing and prevent voltage overshoot of the input capacitor. In general, the damper circuit is external from the integrated circuit of the power converter controller and is implemented with a resistor coupled at the input of the power converter. However, use of the damper resistor alone degrades the overall efficiency of the system.

The damper circuit may be implemented with a resistor, which is coupled between the TRIAC and the input capacitor of the power converter, to dampen inrush current. In general, the damper circuit conducts (and therefore dissipates power) while an ac input voltage is present. However, the damper circuit may only be needed while the TRIAC is on. A switch may be utilized to bypass the damper circuit once inrush current has subsided and therefore limit the power dissipation across the resistor.

Previous solutions have utilized a metal-oxide-semiconductor field-effect transistor (MOSFET) damper circuit to bypass the damper resistor. However, a MOSFET damper circuit requires additional components to facilitate both the turn on and turn off the MOSFET with associated penalties in cost and efficiency. In addition, a MOSFET is susceptible to large current surges. In other words, a large current surge applied across the on-state resistance of the MOSFET appears as a voltage drop that can potentially exceed its breakdown voltage.

Embodiments of the present invention utilize a thyristor such as a silicon controlled rectifier (SCR) damper circuit to bypass the damper resistor. Unlike a MOSFET damper circuit, an SCR damper circuit only needs additional components to facilitate the turn on of the SCR resulting in less overall components than the MOSFET damper. In addition, when the SCR is conducting, the voltage across the SCR is substantially constant regardless of current. As such, the SCR is less susceptible to destructive surge currents.

Referring now to FIG. 1, a diagram of an example switching power converter 100 is depicted including ac input voltage VAC 102, a dimmer circuit 103, a bridge rectifier circuit 104, a dimmer voltage 105, a rectified voltage VRECT 106, an energy transfer element T1 108, a primary winding 110 of the energy transfer element T1 108, a secondary winding 112 of the energy transfer element T1 108, a switch S1 114, an input return 116, a clamp circuit 118, an input capacitor CF 120, a rectifier D1 122, an output capacitor C1 124, an output quantity UO, an output voltage VO, an output current IO, a feedback circuit 128, a feedback signal UFB 130, a controller 138, a drive signal 140, a current sense input signal 142, and switch current ID 144. Also illustrated in FIG. 1 is a load 126 (e.g., one or more light emitting diodes) coupled to the switching power converter 100. The example switching power converter 100 illustrated in FIG. 1 is configured generally as a flyback regulator, which is one example of a switching power converter topology that may benefit from the teachings of the present disclosure. However, it is appreciated that other known topologies and configurations of switching power converter regulators may also benefit from the teachings of the present disclosure. Further depicted is a thyristor damper circuit 150 coupled between a first and second terminal 170, 172 of the rectifier circuit. The thyristor damper circuit 150 includes a bypass enable circuit 152, a damper bypass circuit 154, and a damper circuit 156.

The switching power converter 100 provides output power to the load 126, such as a light emitting diode (LED) for example, from an unregulated input voltage such as the ac input voltage VAC 102. The dimmer circuit 103 provides the dimmer voltage 105 in response to the input voltage VAC 102. The dimmer circuit 103 can be any known dimmer circuit such as a thyristor dimmer circuit or a triode for alternating current (TRIAC) dimmer circuit for example. The rectifier 104 provides the rectified voltage VRECT 106 in response to the dimmer voltage 105. The bridge rectifier 104 is coupled to the energy transfer element T1 108. In some embodiments, the energy transfer element T1 108 can be a coupled inductor. In other embodiments, the energy transfer element T1 108 can be a transformer. In the example of FIG. 1, the energy transfer element T1 108 includes two windings, a primary winding 110 and a secondary winding 112. However, it should be appreciated that the energy transfer element T1 108 can have more than two windings if desired. The primary winding 110 is coupled to switch S1 114, which is further coupled to input return 116. In one embodiment, the switch S1 114 can be a transistor such as a metal-oxide-semiconductor field-effect transistor (MOSFET). In another example, controller 138 can be implemented as a monolithic integrated circuit or may be implemented with discrete electrical components or a combination of discrete and integrated components. In addition, the controller 138 and switch S1 114 can be included in an integrated circuit 146 that is manufactured as either a hybrid or monolithic integrated circuit. An open (i.e. ON) switch may conduct current while a closed (i.e. OFF) switch may cannot conduct current.

As shown, the clamp circuit 118 is coupled across the primary winding 110 of the energy transfer element T1 108. The input capacitor CF 120 can couple across the primary winding 110 and switch S1 114. In other words, the input capacitor CF 120 can couple to the rectifier 104 and input return 116. The secondary winding 112 of the energy transfer element T1 108 is coupled to the rectifier D1 122. Although the rectifier D1 122 is depicted as a diode in this example, the rectifier D1 122 can be a transistor used as a synchronous rectifier if desired. In this example, the output capacitor C1 124 and the load 124 are coupled to the rectifier D1 122. An output is provided to the load 126 and can be provided as either a regulated output voltage VO, regulated output current IO, or a combination thereof.

The switched mode power converter 100 further comprises circuitry to regulate the output, which is shown as output quantity UO. In general, the regulated output quantity UO is either an output voltage VO, output current IO, or a combination thereof. The feedback circuit 128 is operative to sense the output quantity UO of the switched mode power converter 100 and produces the feedback signal UFB 130 based thereon. In one embodiment, the feedback circuit 128 may sense the output quantity UO from the output of the power converter 100. In other embodiments, the feedback signal UFB 130 can be derived from sensing one or more quantities on the input side of the transformer that are representative of the output quantity UO. The feedback circuit 128 is coupled to a terminal of the controller 138 such that the controller 138 receives the feedback signal UFB 130. The controller 138 also includes a terminal for receiving the current sense input signal 142. The current sense input signal 142 is representative of the switch current ID 144 in the switch S1 114. In addition, the switch S1 114 receives the drive signal 140 from the controller 138.

In operation, the switching power converter 100 of FIG. 1 provides output power to the load 126 from an unregulated input such as the ac input voltage VAC 102. The ac input voltage VAC 102 is received by the dimmer circuit 103 and provides the dimmer voltage 105 based thereon. The t dimmer circuit 103 can be utilized when the load 126 coupled to the power converter 100 is a light emitting diode (LED) array to limit the amount of power delivered to the power converter 100. As a result, the current delivered to the load of LED arrays is limited and the LED array dims. In one embodiment, the dimmer circuit 103 is a TRIAC dimmer circuit or other suitable switching dimmer circuit. The dimmer circuit 103 disconnects the ac input voltage VAC 102 from the power converter when the ac input voltage VAC 102 crosses zero voltage. After a given amount of time, the dimmer circuit 103 reconnects the ac input voltage VAC 102 with the power converter 100. Depending on the amount of dimming desired, the dimmer circuit 103 controls the amount of time the ac input voltage VAC 102 is disconnected from the power converter 100. In general, more dimming corresponds to a longer period of time during which the dimmer circuit 103 disconnects the ac input voltage VAC 102. For phase dimming applications of LEDs that utilize a TRIAC dimmer circuit, the TRIAC requires a minimum holding current to keep the TRIAC itself from turning off. The controller 138 utilizes the damper circuit 156 (also referred to as a damper circuit) to help ensure that the current through the TRIAC does not fall below the holding current of the TRIAC. In accordance with embodiments of the preset disclosure, the damper circuit 156 may be bypassed utilizing the bypass enable circuit 152 and damper bypass circuit 154 which may improve efficiency of the power converter 100.

The rectifier circuit 104 provides the rectified voltage VRECT 106 in response to the dimmer voltage 105. The input capacitor CF 120 filters the high frequency current from the switch S1 114. In one example, the input capacitor CF 120 has a capacitance large enough such that a dc voltage is applied to the energy transfer element T1 108. However for power converters with power factor correction (PFC), a small input capacitor CF 120 can be utilized to allow the voltage applied to the energy transfer element T1 108 to substantially follow the rectified voltage VRECT 106. As such, the value of the input capacitor CF 120 can be chosen such that the voltage on the input capacitor CF 120 reaches substantially zero during each half-line cycle of the input line voltage. Or in other words, the voltage on the input capacitor CF 120 substantially follows the positive magnitude of the ac input voltage VAC 102.

The thyristor damper circuit 150 dampens input current 107 to reduce ringing when the dimmer circuit 103 switches on. As noted above, when the dimmer circuit 103 switches on, inrush input current ringing occurs, which may reverse several times during the half line cycle. During these current reversals, the TRIAC of the dimmer circuit 103 may prematurely turn off and cause flickering in the LED lamp. As such, the thyristor damper circuit 150 dampens the input current 107.

For each switching cycle of the dimmer circuit 103, the thyristor damper circuit 150 dampens the input current 107 for a predetermined time when the dimmer circuit 103 switches on and thereafter ceases to dampen the input current 107 after the predetermined time has lapsed. As such, the thyristor damper circuit 150 reduces ringing when the dimmer circuit 103 switches on. In addition, since the thyristor damper circuit 150 is only on for a portion of the time which the dimmer circuit 103 is on, embodiments of the present invention may dissipate less power than a conventional damper circuit which dissipates power when an ac voltage is present.

As noted above, the thyristor damper circuit 150 includes the bypass enable circuit 152, the damper bypass circuit 154, and the damper circuit 156. During a cycle of operation, the dimmer circuit 103 switches on and the damper circuit 156 dampens ringing associated with the input current 107. After the predetermined time, the bypass enable circuit 152 enables the damper bypass circuit 154. As illustrated in FIG. 1, the thyristor damper circuit 150 utilizes the rectified voltage 106 to enable the damper bypass circuit 154. When enabled, the damper bypass circuit 154 bypasses the damper circuit 156 so that the input current 107 is no longer dampened. When the dimmer circuit 103 switches off, the input current 107 reduces, which in turns disables the damper bypass circuit 154. The damper circuit 156 may then dampen the input current 107 when the dimmer circuit 103 switches on for the next half-line cycle.

As shown, the bypass enable circuit 152 includes a resistance 158 and a capacitance 160. In one example, the resistance 158 can have a resistance value of 750 kilo-ohms and the capacitance 160 can have a capacitance value of 470 nanofarads (nF). Other values are contemplated. The resistance 158 and the capacitance 160 form an RC circuit. The time constant of the RC circuit may be utilized to set the predetermined time. As such, the values of the resistance 158 and the capacitance 160 can be selected to provide a desired effective time constant such as 1 millisecond (ms) for example. Other time constants are contemplated. In one embodiment, the bypass enable circuit 152 may enable the damper bypass circuit 154 when the input capacitor CF 120 is completely charged. However, the time it takes for the input capacitor CF 120 to fully charge may change depending on when the dimmer circuit 103 turns on. The charge time of input capacitor CF 120 is longest when the phase angle of the dimmer circuit 103 is 90 degrees. In one embodiment, the predetermined time may be the amount of time for the input capacitor CF 120 to charge when the dimmer circuit 103 has a phase angle of 90 degrees.

The damper bypass circuit 154 includes a thyristor 162 such as a silicon controlled rectifier circuit (SCR) or other suitable thyristor circuit. The damper circuit 156 includes a resistance 164 to dampen ringing of inrush current. In one example, the resistance 164 can have a resistance value of 130 ohms or other suitable value.

During a half line cycle of operation, the dimmer circuit 105 switches on and the capacitance 160 begins to charge. While the capacitance 160 is charging, the input current 107 passes through the resistance 164 and the resistance 164 dampens the ringing of the input current. When the capacitance 160 is charged to a voltage that exceeds a threshold voltage of the thyristor 162, the thyristor 162 turns on and damper bypass circuit 154 bypasses the damper circuit 156. When the damper circuit 156 is bypassed, no current flows through resistance 164 and thus less power is consumed. When the dimmer circuit 103 switches off, the input current 107 reduces, when the input current 107 reduces below the hold current of the SCR 162, the damper bypass circuit 154 disables and current may flow through the damper circuit 156. As such, the thyristor damper circuit 150 may dampen the input current 107 based on the value of the input current (e.g., the input current being less than the hold current) and ceases dampening the rectified voltage based on value of the rectified voltage 106 (e.g., the rectifier voltage being greater than the threshold voltage).

As shown, one end of the resistance 158 is coupled to the first terminal 170 of the rectifier circuit 104. The other end of the resistance 158 is coupled to one end of capacitance 160 and the gate of the thyristor 162. The other end of capacitance 160 is coupled to the cathode of the thyristor 162, resistance 164, and input return 116. As illustrated, input return 116 is coupled to the second terminal 172 of the rectifier circuit 104. The anode of the thyristor 162 is coupled to the resistance 164 and input capacitor 120.

The switching power converter 100 utilizes the energy transfer element T1 108 to transfer voltage between the primary 110 and the secondary 112 windings. The clamp circuit 118 is coupled to the primary winding 110 to limit the maximum voltage on the switch S1 114. Switch S1 114 is opened and closed in response to the drive signal 140. It is generally understood that a switch that is closed may conduct current and is considered on, while a switch that is open cannot conduct current and is considered off. In operation, the switching of the switch S1 114 produces a pulsating current at the rectifier D1 122. The current in the rectifier D1 122 is filtered by the output capacitor C1 124 to produce a substantially constant output voltage VO, output current IO, or a combination of the two at the load 126. In some embodiments, the load 126 is an LED array.

The feedback circuit 128 senses the output quantity UO of the power converter 100 to provide the feedback signal UFB 130 to the controller 138. The feedback signal UFB 130 may be a voltage signal or a current signal and provides information regarding the output quantity UO to the controller 138. In addition, the controller 138 receives the current sense input signal 142 which relays the switch current ID 144 in the switch S1 114. The switch current ID 144 may be sensed in a variety of ways, such for example the voltage across a discrete resistor or the voltage across a transistor when the transistor is conducting.

The controller 138 outputs a drive signal 140 to operate the switch S1 114 in response to various system inputs to substantially regulate the output quantity UO to the desired value. In one embodiment, the drive signal 140 may be a rectangular pulse waveform with varying lengths of logic high and logic low sections, with the logic high value corresponding to a closed switch and a logic low corresponding to an open switch. In another embodiment, the drive signal 140 may be comprised of substantially fixed-length logic high (or ON) pulses and regulated by varying the number of ON pulses per number of oscillator cycles.

Figure 2A:
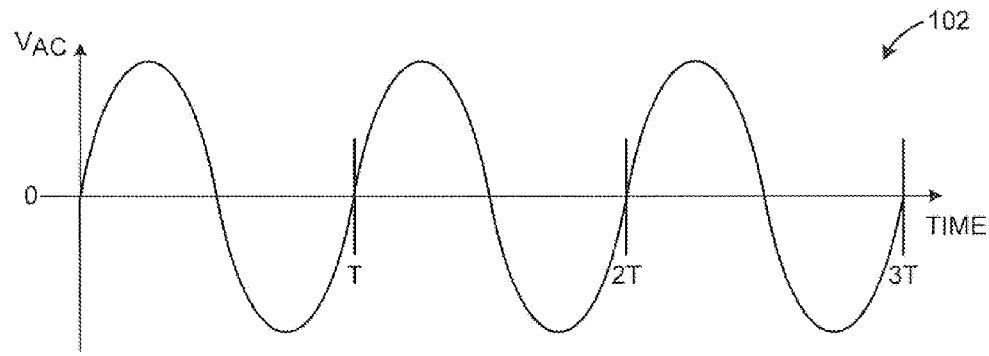
FIG. 2A is a waveform illustrating an example ac input voltage in accordance with teachings of the present disclosure.
Figure 2B:
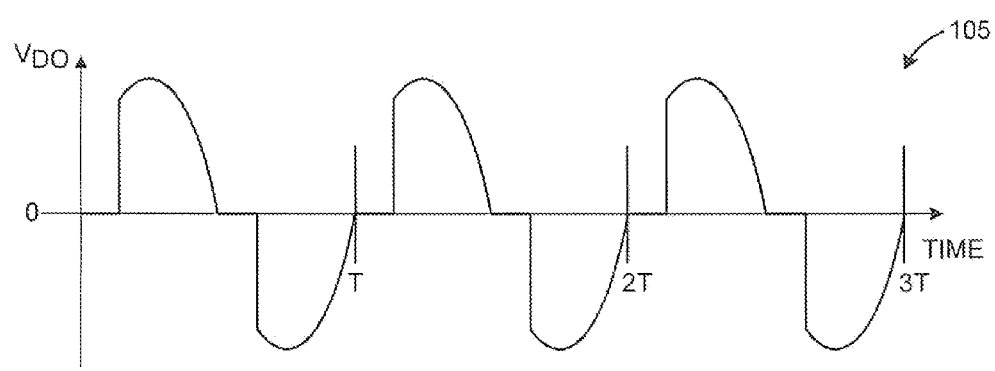
FIG. 2B is a waveform illustrating an example output voltage of a dimmer circuit in accordance with teachings of the present disclosure.
Figure 2C:
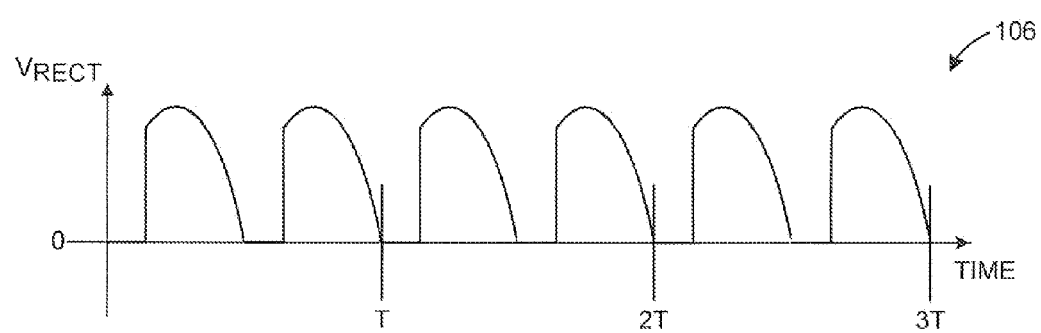
FIG. 2C is a waveform illustrating an example output of a rectifier circuit in accordance with teachings of the present disclosure.

Referring now to FIGS. 2A, 2B and 2C, example waveforms are depicted. More specifically, FIG. 2A depicts the input voltage 102, FIG. 2B depicts the dimmer voltage 105, and FIG. 2C depicts the rectified voltage 106. The dimmer circuit 104 disconnects the ac input voltage VAC 102 from the power converter when the ac input voltage VAC 102 crosses zero voltage. After a given amount of time, the dimmer circuit 104 reconnects the ac input voltage VAC 102 with the power converter. As such, the dimmer circuit 103 removes a portion of the ac input voltage 102 to provide the dimmer voltage 105 thus limiting the amount of voltage and current supplied to a load (such as an LED lamp). This may be referred to as phase dimming because it is often convenient to designate the position of the missing voltage in terms of a fraction of the period of the ac input voltage measured in degrees. As shown, the ac input voltage 102 is a sinusoidal waveform with a period (T). The period T of the ac input voltage 102 is referred to as a full line cycle. As such, half the period of the ac input voltage is referred to as a half line cycle. A full line cycle (period T) has 360 degrees, and a half line cycle (0.5 T) has 180 degrees. The phase angle is a measure of how many degrees (from a reference of zero degrees) of each half line cycle the dimmer circuit 103 removes. As such, removal of half the ac input voltage 102 in a half line cycle by the dimmer circuit 103 corresponds to a phase angle of 90 degrees. In another example, removal of a quarter of the ac input voltage 102 in a half line cycle corresponds to a phase angle of 45 degrees. The rectifier circuit 104 rectifies the dimmer voltage 105 thus providing the rectified voltage 106 as shown. In other words, the rectified voltage 106 substantially follows the positive magnitude of the ac input voltage 102. Or mathematically: $V_{RECT}=|V_{DO}|$.

Figure 3:
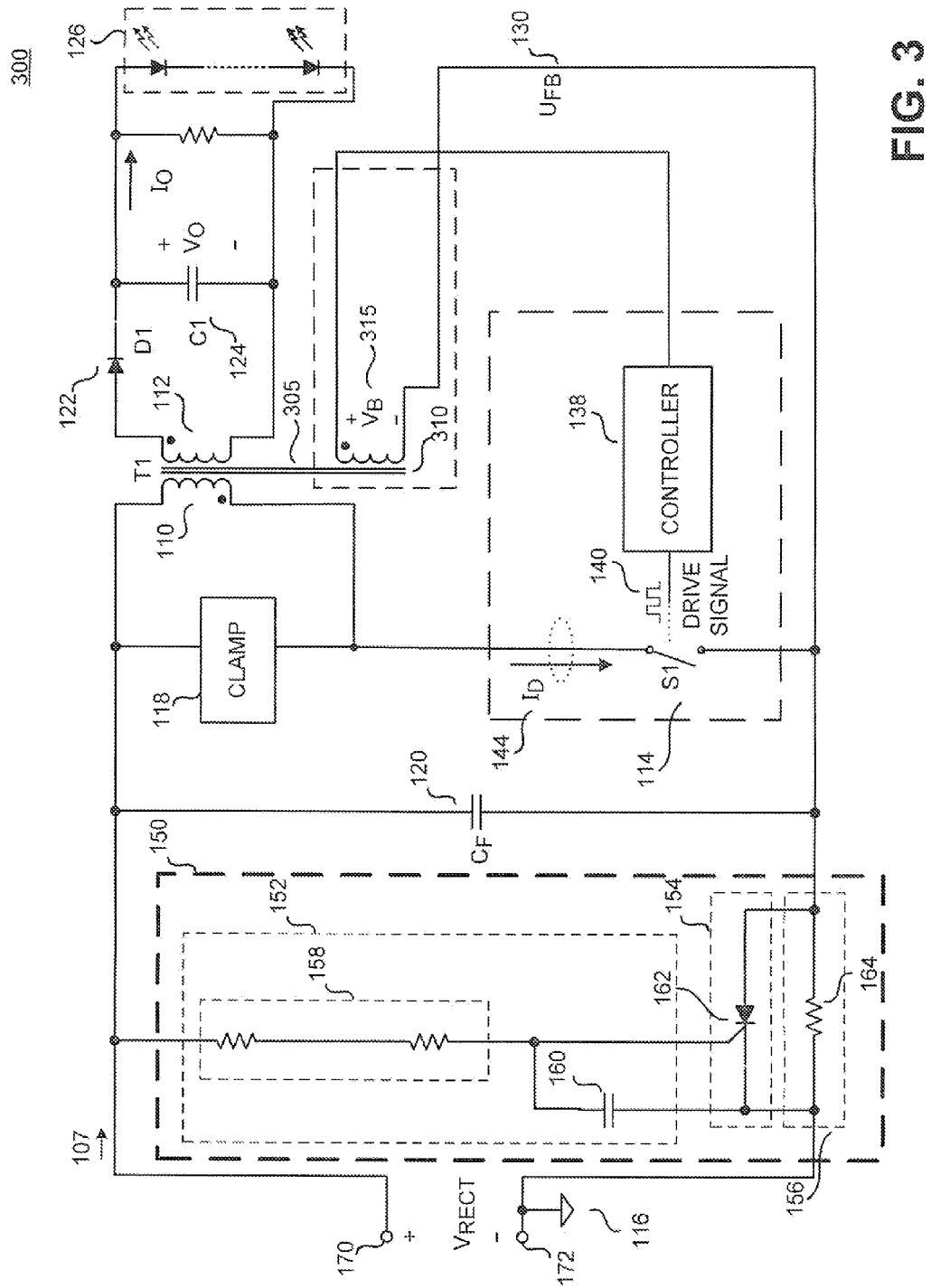
FIG. 3 is a schematic illustrating an example power converter with a thyristor damper circuit in accordance with teachings of the present disclosure.

Referring now to FIG. 3, a diagram of another example of a switching power converter 300 which uses a flyback topology in accordance with teachings of the present disclosure is depicted. In this example, the converter 300 includes a coupled inductor 305 that has a primary winding 110, a secondary winding 112, and a bias winding 310. The bias winding 310 may also be referred to as an auxiliary winding. The bias winding 310 is one example of the feedback circuit 128 introduced in FIG. 1 that produces feedback signal $U_{FB}$ 130. The bias winding 310 produces a voltage VB 315 that is responsive to the output voltage VO when rectifier D1 122 on secondary winding 112 conducts.

It is appreciated that many variations are possible in the use of a bias winding to sense an output voltage and for providing sensing while also providing power to a controller with galvanic isolation. For example, a bias winding may apply a rectifier and a capacitor similar to rectifier D1 122 and capacitor C1 124, respectively, to produce a dc bias voltage while providing an ac feedback signal from the anode of the rectifier. As such, additional passive components such as resistors may be used on the bias winding to scale the voltage from the winding to a value that is more suitable to be received by controller 138.

Use of bias winding 310 to sense output voltage VO has the advantages of providing galvanic isolation between output voltage VO and controller 138 without the expense of an optocoupler. However, t the voltage VB 315 at bias winding 310 is representative of output VO only when output rectifier D1 122 is conducting. Output rectifier D1 122 is conducting only while there is a pulse of current in secondary winding 112.

The rate and magnitude of pulsating current in primary winding 110 is controlled by controller 138 to provide the power required to maintain the desired output voltage VO over a range of values of load 126. As the load approaches zero, less current in primary winding 110 is needed to maintain the desired output voltage VO. As such, controllers may reduce the magnitude of the current in primary winding 110 as well as increase the time between pulses of current.

In this example, the thyristor damper circuit 150, which is coupled between the first and second terminals 170, 172, dampens input current 107 associated with the rectified voltage 106 to reduce ringing when the dimmer circuit 103 switches on. As noted above, when the dimmer circuit 103 switches on, inrush input current ringing occurs, which may reverse several times during the half line cycle. During these current reversals, the TRIAC of the dimmer circuit 103 may prematurely turn off and cause flickering in LED lamps. As such, the thyristor damper circuit 150 dampens the input current 107.

For each time the dimmer circuit 103 connects the ac input voltage 102 with the power converter 100, the thyristor damper circuit 150 dampens the input current 107 for a predetermined time when the dimmer circuit 103 switches on and thereafter ceases to dampen the input current 107 after the predetermined time has lapsed. As such, the thyristor damper circuit 150 reduces ringing when the dimmer circuit 103 switches on.

The thyristor damper circuit 150 couples and functions as discussed above, however, in this example the resistance 158 comprises two resistors in series although other variations are contemplated to provide the resistance.

Figure 4:
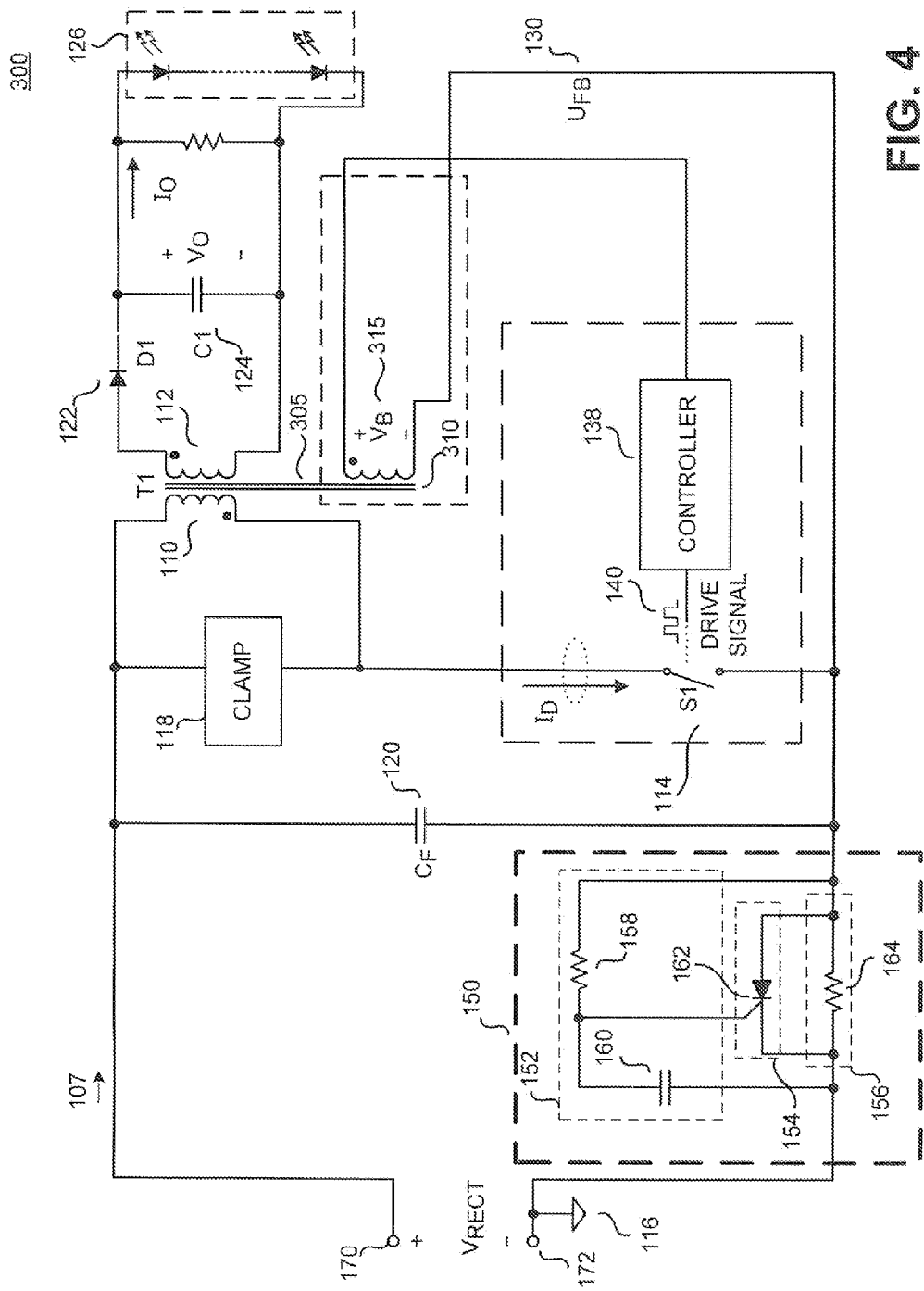
FIG. 4 is a schematic illustrating another example power converter with a thyristor damper circuit in accordance with teachings of the present disclosure.

Referring now to FIG. 4, another example of the switching power converter 300 having the thyristor damper circuit 150. In this example, the thyristor damper circuit 150 is coupled to the second terminal 172 of the rectifier circuit 104. As shown, one end of the resistance 158 is coupled to the input capacitor CF 120 and switch S1 114. The other end of the resistance 158 is coupled to one end of capacitance 160 and the gate of the thyristor 162. The other end of capacitance 160 is coupled to the cathode of the thyristor 162, resistance 164, and input return 116. As illustrated, input return 116 is coupled to the second terminal 172 of the rectifier circuit 104. The anode of the thyristor 162 is coupled to resistance 158, resistance 164, input capacitor 120, and the switch S1 114. Unlike the thyristor damper circuit 150 illustrated in FIGS. 1 and 3, the thyristor damper circuit 150 utilizes the voltage across resistance 164 to enable the damper enable circuit 154.

Figure 5:
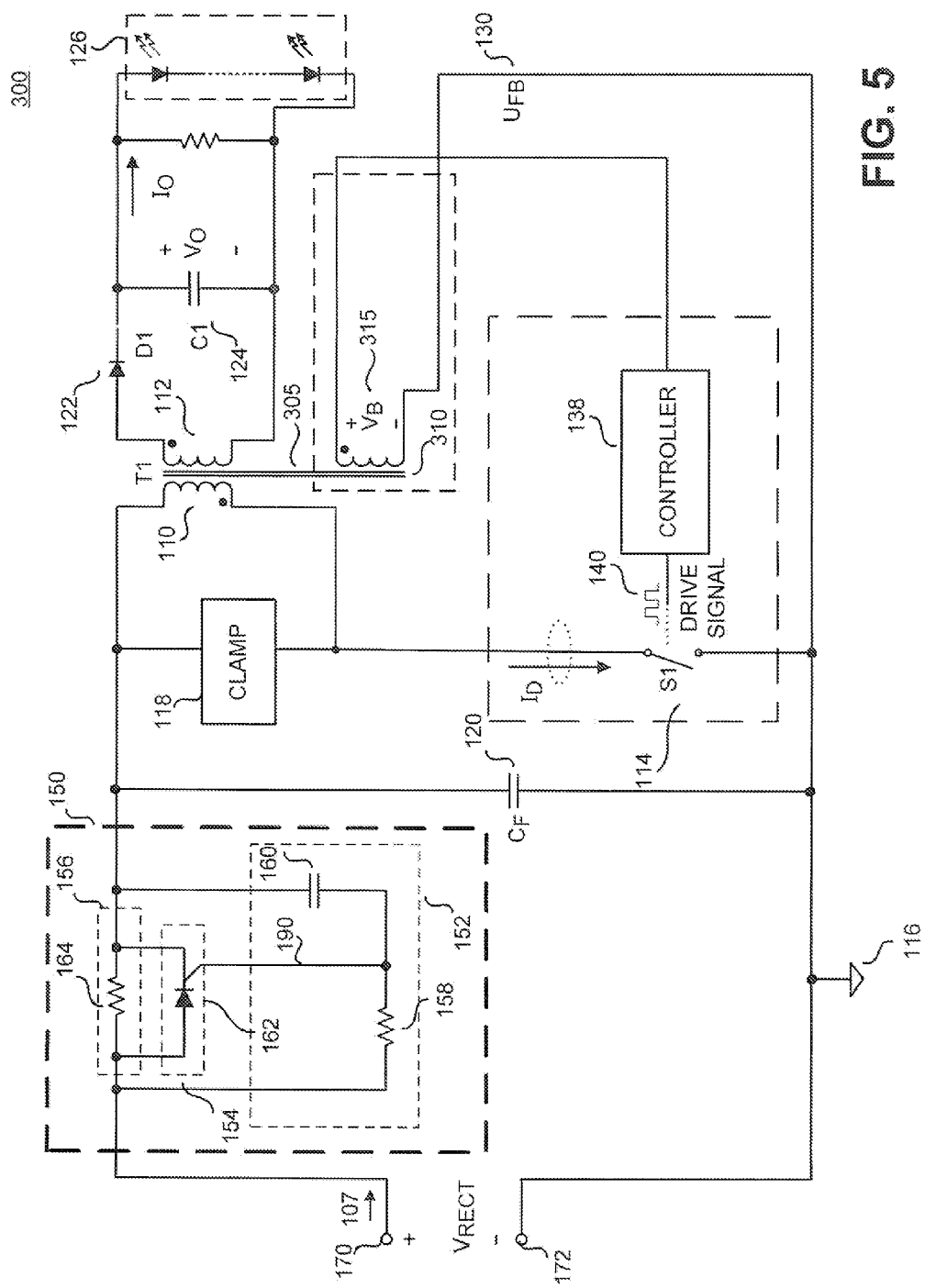
FIG. 5 is a schematic illustrating a further example power converter with a thyristor damper circuit in accordance with teachings of the present disclosure.

Referring now to FIG. 5, another example of the switching power converter 300 having the thyristor damper circuit 150. In this example, the thyristor damper circuit 150 is coupled to the first terminal 170 of the rectifier circuit 104. In the example shown in FIG. 5, the resistance 164 is coupled to first terminal 170. As shown, one end of the resistance 158 is coupled to the first terminal 170 of rectifier circuit 104. The other end of the resistance 158 is coupled to one end of capacitance 160 and the gate of the thyristor 162. The other end of capacitance 160 is coupled to the cathode of the thyristor 162, resistance 164, input capacitor CF 120 and switch S1 114. Anode of thyristor 162 is also coupled to the first terminal 170 of rectifier 104. Similar to FIG. 4, the thyristor damper circuit 150 utilizes the voltage across resistance 164 to enable the damper enable circuit 154. As noted above, among other advantages, the thyristor damper circuit bypasses the damper circuit after a predetermined time. Unlike known MOSFET damper circuits, the thyristor damper circuit only needs additional components to facilitate the turn on of the thyristor (e.g., the thyristor enable circuit) resulting in less overall components than a MOSFET damper circuit. In addition, when the thyristor is conducting, the voltage across the thyristor is substantially constant regardless of current. As such, the thyristor damper circuit is less susceptible to destructive surge currents. Other advantages will be recognized by those of ordinary skill in the art.

Although the disclosure is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

What is claimed is:

1. A circuit for use in a power converter, comprising:
a damping resistance having a first terminal coupled to an output of a rectifier circuit, the damping resistance having a second terminal coupled to a first terminal of an input filter capacitor of the power converter, wherein a second terminal of the input filter capacitor is coupled to the output of the rectifier circuit;
a thyristor having a first terminal coupled to the first terminal of the damping resistance, the thyristor having a second terminal coupled to the second terminal of the damping resistance; and
an enable circuit including a first resistance and a first capacitor coupled between the first terminal of the thyristor and a second terminal of the input filter capacitor of the power converter, wherein a terminal coupled between the first resistance and the first capacitor of the enable circuit is coupled to a gate terminal of the thyristor to enable the thyristor in response to an input voltage of the power converter.

2. The circuit of claim 1 wherein the first resistance of the enable circuit includes a first terminal coupled to the output of the rectifier and to the second terminal of the input filter capacitor of the power converter, wherein the first resistance further includes a second terminal coupled to the terminal coupled between the first resistance and the first capacitor of the enable circuit and to the gate terminal of the thyristor.

3. The circuit of claim 1 wherein the first capacitor of the enable circuit includes a first terminal coupled to the terminal coupled between the first resistance and the first capacitor of the enable circuit and to the gate terminal of the thyristor, wherein the first capacitor further includes a second terminal coupled to the output of the rectifier and to the first terminal of the thyristor.

4. The circuit of claim 1 wherein the input filter capacitor is coupled across a primary winding and a switch of the power converter, wherein the switch of the power converter is coupled to be opened and closed in response to a drive signal to regulate an output of the power converter.

5. The circuit of claim 1 wherein the rectifier circuit is coupled to receive a dimmer voltage from a dimmer circuit, wherein the dimmer circuit is coupled to disconnect a fraction of a period of each half line cycle of an ac input voltage from the power converter.

6. The circuit of claim 5 wherein the damping resistance is coupled to reduce a ringing in an input current of the power converter caused by the dimmer circuit when the thyristor is disabled in response to the enable circuit.

7. The circuit of claim 6 wherein the damping resistance is coupled to be bypassed with the thyristor when the thyristor is enabled in response to the enable circuit.

8. A circuit for use in a power converter for a lighting system, comprising:
a damper circuit coupled to an input of the power converter to dampen an input current of the power converter;
a bypass enable circuit coupled to one end of the damper circuit and to receive an input voltage, wherein the bypass enable circuit is coupled to provide a bypass enable voltage in response to the input voltage reaching a voltage threshold; and
a damper bypass circuit coupled across the damper circuit and coupled to receive the bypass enable voltage, wherein the damper bypass circuit is coupled to bypass the damper circuit in response to the bypass enable voltage to cause the damper circuit to cease damping the input current in response the input voltage reaching the voltage threshold.

9. The circuit of claim 8 wherein the damper circuit includes a damping resistance coupled between the input of the power converter and an input filter capacitor of the power converter.

10. The circuit of claim 8 wherein the bypass enable circuit includes an RC circuit coupled to the input of the power converter to generate the bypass enable voltage in response to the input voltage reaching the voltage threshold.

11. The circuit of claim 8 wherein the damper bypass circuit comprises a thyristor coupled across the damper circuit, wherein the thyristor includes a gate terminal coupled to receive the bypass enable voltage from the bypass enable circuit, wherein the thyristor is coupled to bypass the damper circuit in response to the bypass enable voltage.

12. The circuit of claim 8 wherein the input of the power converter is coupled to receive the input voltage in response to a dimmer voltage output from a dimmer circuit through a rectifier circuit, wherein the dimmer circuit is coupled to disconnect a fraction of a period of each half line cycle of an ac input voltage from the power converter.

13. The circuit of claim 12 wherein the damper circuit is coupled to reduce a ringing in the input current of the power converter caused by the dimmer circuit when the damper bypass circuit is disabled in response to the bypass enable circuit.

14. A circuit for use in a power converter, comprising:
a damping resistance coupled to an input of the power converter to dampen an input current of the power converter;
a bypass circuit coupled across the damping resistance; and
a bypass enable circuit coupled to the bypass circuit and to the input of the power converter, wherein the bypass enable circuit is coupled to enable and disable the bypass circuit coupled across the damping resistance in response to an input voltage coupled to the input of the power converter.

15. The circuit of claim 14 wherein the bypass enable circuit is further coupled across the damping resistance, wherein the bypass enable circuit is further coupled to enable and disable the bypass circuit coupled across the damping resistance in response to a voltage drop across the damping resistance to enable and disable the bypass circuit.

16. The circuit of claim 14 wherein the bypass circuit comprises a thyristor coupled across the damping resistance, wherein the bypass enable circuit is coupled to a gate terminal of the thyristor.

17. The circuit of claim 14 wherein the damping resistance is coupled to reduce a ringing in an input current at the input of the power converter when the bypass circuit is disabled in response to the bypass enable circuit.

18. The circuit of claim 14 wherein a dimmer circuit is coupled to remove a fraction of a period of each half line cycle of an ac input voltage, wherein the input of the power converter is coupled to be responsive to the ac input voltage.

19. The circuit of claim 18 wherein a rectifier circuit is to be coupled between the dimmer circuit and the input of the power converter.

20. The circuit of claim 14 wherein the damping resistance is further coupled an input filter capacitor of the power converter, wherein the input filter capacitor is coupled between the input of the power converter and the damping resistance.

* * * * *